(12) United States Patent
Chen

(10) Patent No.: US 11,190,323 B2
(45) Date of Patent: Nov. 30, 2021

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 167 days.

(21) Appl. No.: 16/726,636

(22) Filed: Dec. 24, 2019

(65) Prior Publication Data

US 2020/0136780 A1 Apr. 30, 2020

Related U.S. Application Data

(63) Continuation of application No. PCT/CN2018/086046, filed on May 8, 2018.

(51) Int. Cl.
*H04L 5/00* (2006.01)
*H04B 7/06* (2006.01)
(Continued)

(52) U.S. Cl.
CPC ......... *H04L 5/0053* (2013.01); *H04W 72/042* (2013.01); *H04W 72/082* (2013.01); *H04W 72/085* (2013.01)

(58) Field of Classification Search
CPC ............. H04W 72/082; H04W 72/042; H04W 72/085; H04W 24/10; H04L 5/0057;
(Continued)

(56) References Cited

U.S. PATENT DOCUMENTS

2011/0305161 A1 12/2011 Ekpenyong
2017/0366998 A1* 12/2017 Lee ..................... H04W 24/10
(Continued)

FOREIGN PATENT DOCUMENTS

CN 101630981 A 1/2010
CN 102811456 A 12/2012
(Continued)

OTHER PUBLICATIONS

International Search Report (ISR) with an English translation dated Feb. 14, 2019 for Application No. PCT/CN2018/086046.
(Continued)

*Primary Examiner* — Pankaj Kumar
*Assistant Examiner* — Kenneth P Hunt
(74) *Attorney, Agent, or Firm* — Ladas & Parry LLP

(57) ABSTRACT

The embodiments of the present disclosure provide a wireless communication method, a terminal device and a network device. The method includes: receiving first information and second information transmitted by a network device, where the first information is configured to trigger the terminal device to feed back aperiodic N CSIs, and to indicate a PUSCH resource to be used when the CSIs are fed back, and the second information is configured to indicate channel measurement and interference measurement resources corresponding to the N CSIs; determining M CSIs that need to be fed back from the N CSIs according to the first information, the second information and M CSI processing units currently in an idle state; calculating payloads of the M CSIs that need to be fed back, respectively, and feeding back the M CSIs that need to be fed back on the PUSCH resource.

14 Claims, 5 Drawing Sheets

(51) Int. Cl.
*H04W 48/02* (2009.01)
*H04W 72/04* (2009.01)
*H04W 72/12* (2009.01)
*H04W 72/08* (2009.01)

(58) Field of Classification Search
CPC ... H04L 5/0092; H04L 5/0053; H04L 5/0082; H04L 5/001; H04L 5/0023; H04L 1/0026
See application file for complete search history.

(56) References Cited

U.S. PATENT DOCUMENTS

| | | | |
|---|---|---|---|
| 2019/0165847 A1* | 5/2019 | Kim | H04L 5/0091 |
| 2019/0312614 A1 | 10/2019 | Kim et al. | |
| 2020/0177254 A1* | 6/2020 | Lee | H04L 5/0051 |
| 2021/0258875 A1* | 8/2021 | Xue | H04W 52/0212 |

FOREIGN PATENT DOCUMENTS

| | | |
|---|---|---|
| CN | 103188710 A | 7/2013 |
| CN | 2013155692 A | 10/2013 |
| CN | 103580818 A | 2/2014 |
| CN | 104253674 A | 12/2014 |
| CN | 104303430 A | 1/2015 |
| CN | 104662945 A | 5/2015 |
| CN | 106063179 A | 10/2016 |
| CN | 106455091 A | 2/2017 |
| CN | 106982111 A | 7/2017 |
| CN | 107294643 A | 10/2017 |
| CN | 107371194 A | 11/2017 |
| EP | 3639400 A1 | 4/2020 |
| WO | 2018012850 A1 | 1/2018 |

OTHER PUBLICATIONS

The first OA of the parallel CN application 201880003223.X dated Dec. 12, 2019.

The Notice of Allowance of the parallel CN application 201880003223.X dated Mar. 2, 2020.

Ericsson:"Clarification and correction on CSI reporting", 3GPP Draft; R1-1802742 Clarification and Correction on CSI Reporting, 3rd Generation Partnership Project (3GPP), Mobile Competence Centre; 650, Route Des Lucioles; F-06921 Sophia-Antipolis Cedex; F, vol. RAN WG1, No. Athens, Greece; Feb. 26, 2018-Mar. 2, 2018 Feb. 17, 2018(Feb. 17, 2018), XP051398174.

Ericsson:"CSI framework simplification", 3GPP Draft; R1-1802740 CSI Framework Simplification, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 17, 2018(Feb. 17, 2018), XP051396172.

Nokia:"draftCR to 38.214 capturing the RAN1#92bis meeting agreements", 3GPP Draft; R1-1805777-38214, 3rd Generation Partnership Project (3GPP), Mobile Competence Centre; 650, Route Des Lucioles; F-06921 Sophia-Antipolis Cedex; France, vol. RAN WG1, No. Sanya. P. R. China; Apr. 16, 2018-Apr. 20, 2018 May 1, 2016(May 1, 2016), XP051448969.

* cited by examiner

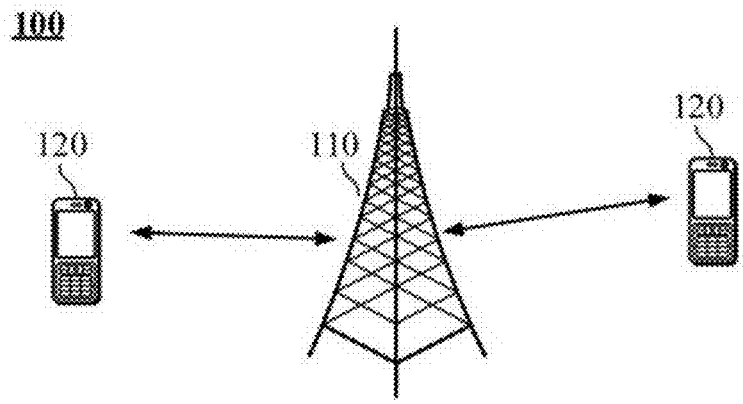

FIG. 1

A terminal device receives first information and second information transmitted by a network device, where the first information is configured to trigger the terminal device to feed back aperiodic N CSIs, and to indicate a PUSCH resource to be used when the CSIs are fed back, and the second information is configured to indicate channel measurement and interference measurement resources corresponding to the N CSIs, N being an integer greater than or equal to 2 — S210

The terminal device determines M CSIs that need to be fed back from the N CSIs according to the first information, the second information and M CSI processing units currently in an idle state, M being an integer greater than 0 and less than N — S220

The terminal device calculates payloads of the M CSIs that need to be fed back, respectively, and feeds back the M CSIs that need to be fed back on the PUSCH resource — S230

FIG. 2

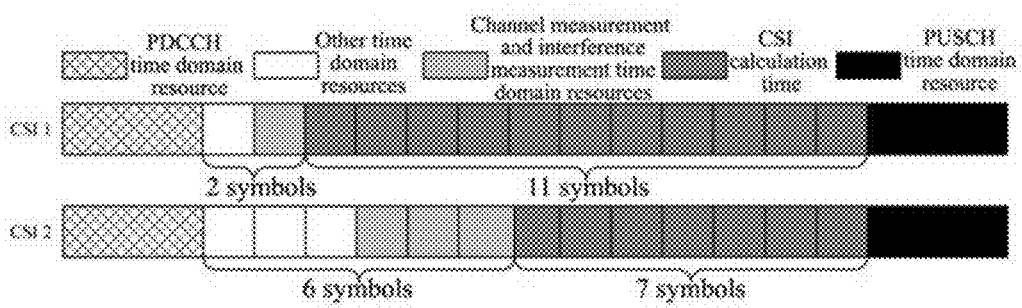

FIG. 3

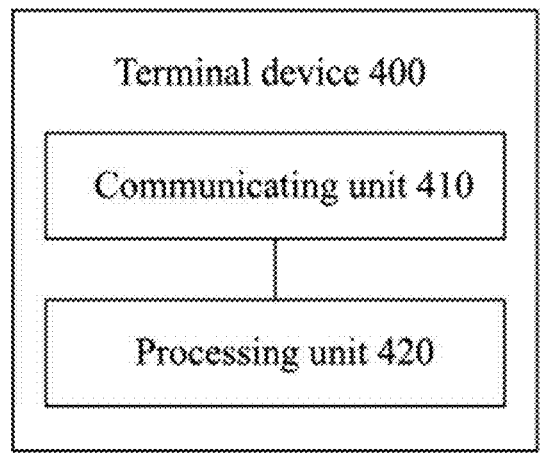
FIG. 6
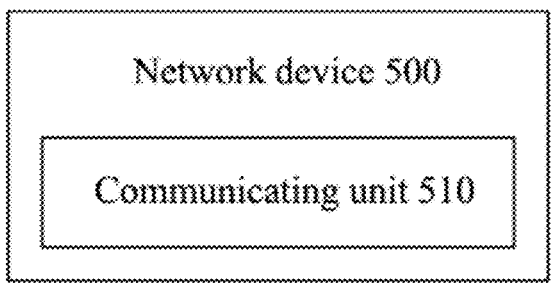
FIG. 7
Network device 500
Communicating unit 510
FIG. 8

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2018/086046, filed on May 8, 2018, the disclosure of which is hereby incorporated by reference in its entirety.

TECHNICAL FIELD

The embodiments of the present disclosure relate to the field of communication technologies and, in particular, to a wireless communication method, a terminal device and a network device.

BACKGROUND

In a New Radio (NR) system there exists a Channel State Information (CSI) report which is triggered aperiodically. A network device (for example, a base station) may trigger one or more CSIs to be reported at the same time by Downlink Control Information (DCI) signaling. When the number M of CSI processing units not occupied in a terminal device is less than the number N of CSIs triggered by the DCI signaling, the terminal device can select M CSIs therefrom to report. However, there is no specific solution for the terminal device to select M CSIs from the N CSIs.

SUMMARY

The embodiments of the present disclosure provide a wireless communication method, a terminal device and a network device, when there are not enough CSI processing units in the idle state, the terminal device can select a part of CSIs from a plurality of aperiodic CSIs that are triggered by the network device to be fed back to feed back, and the manner of CSI feedback is more flexible.

In a first aspect, a wireless communication is provided, which includes:

receiving, by a terminal device, first information and second information transmitted by a network device, where the first information is configured to trigger the terminal device to feed back aperiodic N CSIs, and to indicate a Physical Uplink Shared Channel (PUSCH) resource to be used when the CSIs are fed back, and the second information is configured to indicate channel measurement and interference measurement resources corresponding to the N CSIs, N being an integer greater than or equal to 2;

determining, by the terminal device, M CSIs that need to be fed back from the N CSIs according to the first information, the second information and M CSI processing units currently in an idle state, M being an integer greater than 0 and less than N;

calculating, by the terminal device, payloads of the M CSIs that need to be fed back, respectively, and feeding back the M CSIs that need to be fed back on the PUSCH resource.

Therefore, in the embodiments of the present disclosure, the network device triggers the terminal device to feed back N aperiodic CSIs, while the terminal device has only M CSI processing units in the idle state currently, the terminal device determines M CSIs that need to be fed back from the N CSIs, and feeds back on the PUSCH resource indicated by the network device, and thus, the feeding back of CSI is performed with more flexibility.

It should be noted that in the embodiments of the present disclosure, when a user's CSI processing capability is Type A, the calculation time required for M CSIs is the sum of the calculation times required for each CSI.

In some possible implementations, determining, by the terminal device, M CSIs that need to be fed back from the N CSIs according to the first information, the second information and M CSI processing units currently in the idle state, includes:

determining, by the terminal device, at least one first time span for CSI calculation according to the first information, the second information and the M CSI processing units currently in the idle state;

determining, by the terminal device, the M CSIs that need to be fed back from the N CSIs according to the at least one first time span.

In some possible implementations, determining, by the terminal device, at least one first time span for CSI calculation according to the first information, the second information and the M CSI processing units currently in the idle state, includes:

determining, by the terminal device, a time span between a last symbol of a resource that appears first among channel measurement and interference measurement resources corresponding to each CSI group of X CSI groups following a Physical Downlink Control Channel (PDCCH), and a first symbol reported on a PUSCH as one first time span, to obtain X first time spans, where each CSI group includes M CSIs, and each CSI in the X CSI groups belongs to the N CSIs, X being an integer greater than or equal to 2.

In some possible implementations, determining, by the terminal device, at least one first time span for CSI calculation according to the first information, the second information and the M CSI processing units currently in the idle state, includes:

determining, by the terminal device, a time span between a last symbol of a resource that appears first among channel measurement and interference measurement resources corresponding to T CSIs in each CSI group of X CSI groups following a PDCCH, and a first symbol reported on a PUSCH as one first time span, to obtain X first time spans, where each CSI includes M CSIs, and channel measurement and interference measurement resources corresponding to M-T CSIs included in each CSI are periodic resources or quasi periodic resources, and the terminal device has already cached downlink channel information corresponding to the M-T CSIs before receiving the first information and the second information, and each CSI in the X CSI groups belongs to the N CSIs, X being an integer greater than or equal to 2, and being an integer greater than 0 and less than M.

In some possible implementations, when subcarrier spacings of channel measurement and interference measurement resources corresponding to different CSIs of the N CSIs are different, a calculation time required for each CSI of the N CSIs is obtained according to a calculation time and a time unit corresponding to a minimum subcarrier spacing of a subcarrier spacing of channel measurement and interference measurement resources corresponding to each CSI of the N CSIs and a subcarrier spacing for reporting the PUSCH.

In some possible implementations, when subcarrier spacings of channel measurement and interference measurement resources corresponding to different CSIs of the N CSIs are different, a calculation time required for each CSI of the N CSIs needs to be convened to an absolute length of time, and the absolute length of time is obtained according to a time unit and a calculation time (measured by OFDM symbols) corresponding to a minimum subcarrier spacing selected according to a subcarrier spacing of a measurement resource and a subcarrier spacing for reporting the PUSCH.

It should be noted that the measurement resource may be a channel measurement resource and/or an interference measurement resource.

In some possible implementations, determining, by the terminal device, the M CSIs that need to be fed back from the N CSIs according to the at least one first time span, includes:

determining, by the terminal device, at least one first time span satisfying a first condition from the X first time spans, and taking M CSIs corresponding to each of the at least one first time span satisfying the first condition as a CSI candidate, to obtain at least one CSI candidate, where the first condition is that a first time span is longer than or equal to a sum of respective calculation times of corresponding M CSIs;

determining, by the terminal device, the M CSIs that need to be fed back from the at least one CSI candidate.

In some possible implementations, determining, by the terminal device, at least one first time span for CSI calculation according to the first information and the second information, includes:

determining, by the terminal device, a time span between a last symbol of a resource that appears first among the channel measurement and interference measurement resources corresponding to the N CSIs following a PDCCH, and a first symbol reported on a PUSCH as the first time span, where the channel measurement and interference measurement resources corresponding to the N CSIs may be periodic resources, quasi-periodic resources, or aperiodic resources.

In some possible implementations, determining, by the terminal device, at least one first time span for CSI calculation according to the first information, the second information and the M CSI processing units currently in the idle state, includes:

determining, by the terminal device, a time span between a last symbol of a resource that appears first among the channel measurement and interference measurement resources corresponding to K CSIs of the N CSIs following a PDCCH, and a first symbol reported on a PUSCH as the first time span, where the channel measurement and interference measurement resources corresponding to N-K CSIs of the N CSIs are periodic resources or quasi-periodic resources, and the terminal device has already cached downlink channel information corresponding to the N-K CSIs before receiving the first information and the second information, K being an integer greater than 0 and less than N.

In some possible implementations, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting the PUSCH.

In some possible implementations, determining, by the terminal device, the M CSIs that need to be fed back from the N CSIs according to the at least one first time span, includes:

determining, by the terminal device, M CSIs which satisfy a second condition as a CSI candidate, to obtain at least one CSI candidate, where the second condition is that a sum of respective calculation times of the M CSIs is shorter than or equal to the first time span;

determining, by the terminal device, the M CSIs that need to be fed back from the at least one CSI candidate.

In some possible implementations, determining, by the terminal device, the M CSIs that need to be fed back from the at least one CSI candidate, includes:

selecting, by the terminal device, from the at least one CSI candidate, a CSI candidate with a maximum sum of calculation times required as the M CSIs that need to be fed back; or selecting, by the terminal device, from the at least one CSI candidate, a CSI candidate with a highest priority as the M CSIs that need to be fed back; or selecting, by the terminal device, from the at least one CSI candidate, the M CSIs that need to be fed back according to a CSI configuration order; or selecting, by the terminal device, from the at least one CSI candidate, a CSI candidate with a minimum sum of CSI payloads as the M CSIs that need to be fed back; or selecting, by the terminal device, from the at least one CSI candidate, a CSI candidate with a maximum sum of CSI payloads as the M CSIs that need to be fed back; or selecting, by the terminal device, from the at least one CSI candidate, a CSI candidate with a maximum sum of CSI payloads that the PUSCH resource can support as the M CSIs that need to be fed back.

In some possible implementations, determining, by the terminal device, M CSIs that need to be fed back from the N CSIs according to the first information, the second information and M CSI processing units currently in an idle state, includes:

calculating, by the terminal device, priorities of the N CSIs, and selecting in turn, according to an order of the priorities, M CSIs with highest priorities from the N CSIs as the M CSIs that need to be fed back.

In some possible implementations, determining, by the terminal device, M CSIs that need to be fed back from the N CSIs according to the first information, the second information and M CSI processing units currently in an idle state, includes:

selecting, by the terminal device, according to an order of configuring the N CSIs, M CSIs that are configured first from the N CSIs as the M CSIs that need to be fed back.

In some possible implementations, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting the PUSCH.

In some possible implementations, the method further includes:

giving up, by the terminal device, on feeding back the M CSIs that need to be fed back, if a calculation time required for the M CSIs that need to be fed back is longer than a time span between a last symbol of channel measurement and interference measurement resources corresponding to the M CSIs that need to be fed back and a first symbol reported on a PUSCH.

In some possible implementations, the method further includes:

giving up, by the terminal device, on feeding back the M CSIs that need to be fed back, if a sum of time spans from detecting a PDCCH to reporting a PUSCH that are respectively required for the M CSIs that need to be fed back is longer than a time span between a last symbol of a PDCCH and a first symbol reported on a PUSCH.

In some possible implementations, the first information is specifically configured to indicate a PUSCH time domain resource to be used when the CSIs are fed back, and the PUSCH time domain resource includes: a slot location, a starting symbol and lasting symbols.

In some possible implementations, the second information is specifically configured to indicate channel measurement and interference measurement time domain resources corresponding to the N CSIs, and the channel measurement and interference measurement time domain resources include a slot location, a starting symbol and lasting symbols.

In some possible implementations, the channel measurement and interference measurement resources indicated by the second information are one type among periodic resources, quasi-periodic resources and aperiodic resources.

In some possible implementations, the first information is DCI, and the second information is one of DCI, Radio Resource Control (RRC) dedicated signaling and Media Access Control Control Element (MAC CE).

In a second aspect, a wireless communication method is provided, which includes:

transmitting, by a network device, first information and second information to a terminal device, where the first information is configured to trigger the terminal device to feed back aperiodic N CSIs, and to indicate a PUSCH resource to be used when the CSIs are fed back, the second information is configured to indicate channel measurement and interference measurement resources corresponding to the N CSIs, the terminal device has M CSI processing units of the terminal device currently in an idle state, N being an integer greater than or equal to 2, M being an integer greater than 0 and less than N;

receiving, by the network device, M CSIs fed back by the terminal device on the PUSCH resources.

Therefore, in the embodiments of the present disclosure, the network device triggers the terminal device to feed back N aperiodic CSIs, while the terminal device has only M CSI processing units currently in the idle state, the terminal device determines M CSIs that need to be ted back from the N CSIs, and feed back on the PUSCH resource indicated by the network device, and thus, the feeding back of CSI is performed with more flexibility.

In some possible implementations, the first information is specifically configured to indicate a PUSCH time domain resource to be used when the CSIs are fed back, where the PUSCH time domain resource includes: a slot location, a starting symbol and lasting symbols.

In some possible implementations, the second information is specifically configured to indicate channel measurement and interference measurement time domain resources corresponding to the N CSIs, where the channel measurement and interference measurement time domain resources include a slot location, a starting symbol and lasting symbols.

In some possible implementations, the channel measurement and interference measurement resources indicated by the second information are one type among periodic resources, quasi-periodic resources and aperiodic resources.

In some possible implementations, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting a PUSCH.

In some possible implementations, the first information is DCI, and the second information is one of DCI, RRC dedicated signaling or MAC CE.

In a third aspect, a terminal device is provided, which is configured to execute the method according to the first aspect or various implementations thereof described above.

Specifically, the terminal device includes function modules configured to execute the method according to the first aspect or various implementations thereof described above.

In a fourth aspect, a network device is provided, which is configured to execute the method according to the second aspect or various implementations thereof described above.

Specifically, the network device includes function modules configured to execute the method according to the second aspect or various implementations thereof described above.

In a fifth aspect, a terminal device is provided, which includes: a processor and a memory. The memory is configured to store a computer program, and the processor is configured to call and run the computer programs stored in the memory, to execute the method according to the first aspect or various implementations thereof described above.

In a sixth aspect, a network device is provided, which includes: a processor and a memory. The memory is configured to store a computer program, and the processor is configured to call and run the computer programs stored in the memory to execute the method according to the second aspect or various implementations thereof described above.

In a seventh aspect, a chip is provided, which is configured to implement the method according to any one of the first aspect and the second aspect. Of the various implementations thereof described above.

Specifically, the chip includes: a processor, configured to call and run a computer program from a memory to cause a device which is equipped with the chip to perform the method according to any one of the first aspect and the second aspect, or the various implementations thereof described above.

In an eighth aspect, a computer readable storage medium is provided, which is configured to store a computer program where the computer program enables a computer to execute the method according to any one of the first aspect and the second aspect, or the various implementations thereof described above.

In a ninth aspect, a computer program product including computer program instructions which cause a computer to perform the method according to any one of the first aspect and the second aspect, or the various implementations thereof described above.

A tenth aspect provides a computer program, which when run on a computer, causes the computer to perform the method according to any one of the first aspect and the second aspect, or the various implementations thereof described above.

An eleventh aspect provides a wireless communication system, including:

a terminal device and a network device; where, the terminal device is configured to: receive first information and second information transmitted by the network device, where the first information is configured to trigger the terminal device to feed back aperiodic N CSIs, and to indicate a PUSCH resource to be used when the CSIs are fed back, the second information is configured to indicate channel measurement and interference measurement resources corresponding to the N CSIs, N being an integer greater than or equal to 2; determine M CSIs that need to be fed back from the N CSIs according to the first information, the second information and M CSI processing units currently in an idle state, M being an integer greater than 0 and less than N; and calculate payloads of the M CSIs that need to be fed back, respectively, and feedback the M CSIs that need to be fed back on the PUSCH resource;

the network device is configured to: transmit first information and second information to the terminal device, where the first information is configured to trigger the terminal device to feed back aperiodic N CSIs, and to indicate the PUSCH resource to be used when the CSIs are fed back, the second information is configured to indicate the channel measurement and interference measurement resources corresponding to the N CSIs, and the terminal device has M CSI processing units currently in the idle state, N being an integer greater than or equal to 2, M being an integer greater than 0 and less than N; receive M CSIs fed back by the terminal device on the PUSCH resource.

Specifically, the terminal device is configured to execute the method according to the first aspect or various implementations thereof described above, and the network device is configured to execute the method according to the second aspect or various implementations thereof described above.

BRIEF DESCRIPTION OF DRAWINGS

FIG. 1 is a schematic diagram of an application scenario of an embodiment of the present disclosure;

FIG. 2 is a schematic flowchart of a wireless communication method according to an embodiment of the present disclosure;

FIG. 3 is a schematic distribution map of time domain resources according to an embodiment of the present disclosure;

FIG. 6 is a schematic flowchart of a wireless communication method according to another embodiment of the present disclosure;

FIG. 7 is a schematic block diagram of a terminal device according to an embodiment of the present disclosure;

FIG. 8 is a schematic block diagram of a network device according to an embodiment of the present disclosure;

DESCRIPTION OF EMBODIMENTS

Figure 4:
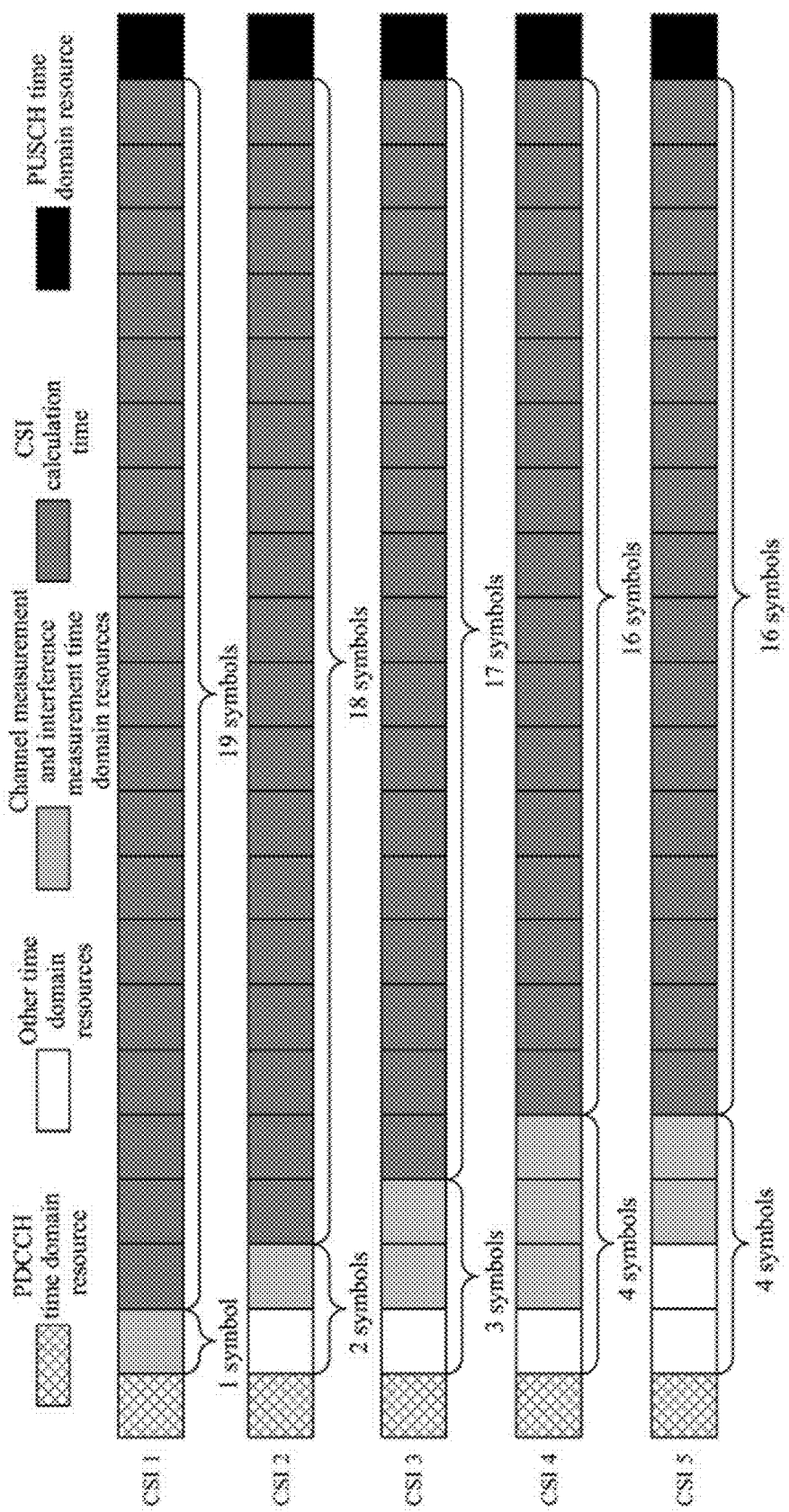
FIG. 4 is a schematic distribution map of time domain resources according to another embodiment of the present disclosure.

The technical solution of the present disclosure is hereinafter described with reference to the accompanying drawings in the embodiments of the present disclosure.

The embodiments of the present disclosure may be applied to various communication systems, such as Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), the next generation communication system or other communication systems.

Generally speaking, conventional communication systems support a limited number of connections, which is easy to implement. However, with development of communication technologies, a mobile communication system will not only support conventional communication, but also support Device to Device (D2D) communication, Machine to Machine (M2M) communication, Machine Type Communication (MTC), Vehicle to Vehicle (V2V) communication and the like, and the embodiments of the present disclosure may as well be applied to these communication systems.

In an implementation, a communication system in the embodiments of the present disclosure may be applied to a Carrier Aggregation (CA) scenario, and may be applied to a Dual Connectivity (DC) scenario, and also may be applied to a Standalone (SA) network deployment scenario.

Spectrum that is applied to is not limited in the embodiments of the present disclosure. For example, the embodiments of the present disclosure may be applied to licensed spectrum, and may be applied to unlicensed spectrum as well.

Various embodiments of the present disclosure are described with reference to a network device and a terminal device, where the terminal device may be referred to as a User Equipment (UE), an access terminal, a user unit, a user station, a mobile station, a mobile platform, a remote station, a remote terminal, a mobile device, a user terminal, a terminal, a wireless communication device, a user proxy, a user device or the like, the terminal device may be a STATION (ST) in WLAN, a cellular telephone, a wireless telephone, a Session Initiation Protocol (SIP) telephone, a Wireless Local Loop (WLL) station or a Personal Digital Assistant (PDA) device, and may be a handheld device, computing device, or other processing devices connected to a wireless modem, which are equipped with wireless communication functionality, and may be a vehicle-mounted device, a wearable device or a next generation communication system, such as a terminal device in an NR network, a terminal device in a future evolution Public Land Mobile Network (PLMN) network or the like.

In an embodiment of the present disclosure, as an example but not a limitation, a terminal device may also be a wearable device. The wearable device, which may also be referred to as wearable smart device, is a generic term for wearable devices such as glasses, gloves, watches, clothes and adornments, and shoes, which are suitable for wearing and developed from wearable items in daily life by intelligent design with wearable technologies. A wearable device is namely a portable device which is directly wearable or integrated into clothes or adornments of users. A wearable device is not only just a kind of hardware device, but more of powerful functionalities implemented by software support, dada exchange, and interaction with cloud. A wearable device in a broad sense may include, for example, smart watches, smart glasses or the like, which have full functionality and large size and perform complete or partial functionality independently from a smart phone, and may also include, for example, various smart bracelets, smart jewelry or the like for physical signs monitoring, which focus on a certain type of application function and need to be used in cooperation with other devices, such as a smart phone.

A network device may be a device used for communicating with a mobile device, which may be an Access Point (AP) in WLAN, a Base Transceiver Station (BTS) in GSM or CDMA, or a NodeB (NB) in WCDMA, or may be an Evolutional Node B (eNB or eNodeB) in LTE, or a relay station or an access point, or a vehicle-mounted device, a wearable device, or a network device (gNB) in NR network, or a network device in future evolutional PLMN or the like.

In the embodiments of the present disclosure, a network device provides services for a cell, a terminal device communicates with the network device on transmission resources (for example, frequency domain resources, or in other words, frequency spectrum resources) used in the cell. The cell may be a cell corresponding to the network device (a base station, for example), and the cell may belong to a macro base station, or belong to a base station corresponding to a small cell. The small cell herein may include: metro cell, micro cell, pico cell, femto cell and the like. These small cells are featured with small coverage area and low transmission power, and are suitable for providing high-speed data transmission services.

FIG. 1 illustratively shows one network device and two terminal devices. In an implementation, the wireless communication system 100 may include multiple network devices, and include another number of terminal devices within the coverage area of each network device, which is not limited in the embodiments of the present disclosure.

In an implementation, the wireless communication system 100 may further include Mobility Management Entity (MME), Access and Mobility Management Function (AMF) and other network entities, which is not limited in the embodiments of the present disclosure.

Additionally, individual aspects or features of the present disclosure may be implemented as a method, apparatus, or product of standard programming and/or engineering technologies. For example, the term "product" as used in the present disclosure encompasses a computer program accessible from any computer-readable device, carrier, or medium. For example, a computer readable medium may include but not limited to, a magnetic storage device (for example, a hard disk, a floppy disk, a magnetic tape or the like), an optical disk (for example, a Compact Disk (CD), a Digital Versatile Disk (DVD) or the like.), a smart card or flash memory device (for example, an Erasable Programmable Read-Only Memory (EPROM), card, stick, key drive or the like). Besides, various storage media described herein may represent one or more devices for storing information and/or other machine-readable media. The term "machine-readable media" may include but not limited to, various media capable of storing, containing and/or carrying instructions and/or data.

It should be understood thin the terms "system" and "network" are often used interchangeably herein. The term "and/or" herein is merely a description of the relationship between related objects, which indicates that there may be three kinds of relationships, for example, A author B, which may indicate three situations where A exists alone, both A and B exist, and B exists alone. Additionally, the character "/" herein generally indicates that the related objects before and after are in an "or" relationship.

The wireless communication method of the embodiments of the present disclosure is described in the following with reference to FIG. 2 to FIG. 6. It should be understood that FIG. 2 to FIG. 6 are just illustrative flowcharts of the wireless communication method of the embodiments of the present disclosure, which illustrate specific communicating steps or operations of the method. However, these steps or operations are just illustrative, and other operations or various variants of the operations illustrated in FIG. 2 to FIG. 6 may be performed in the embodiments of the present disclosure, and the order to execute the steps illustrated in FIG. 2 to FIG. 6 is not limited in the embodiments of the present disclosure.

Additionally, the steps illustrated in FIG. 2 to FIG. 6 may be performed respectively in a different order from the orders illustrated in FIG. 2 to FIG. 6, and it is possible that not all the operations in FIG. 2 to FIG. 6 are to be performed.

FIG. 2 is a schematic flowchart of a wireless communication method 200 according to an embodiment of the present disclosure. The method 200 may in an implementation be applied, but not limited to being applied, to the system illustrated in FIG. 1. The method 200 includes at least part of the following contents.

S210, a terminal device receives first information and second information transmitted by a network device, where the first information is configured to trigger the terminal device to feed back aperiodic N CSIs, and to indicate a PUSCH resource to be used when the CSIs are fed back, the second information is configured to indicate channel measurement and interference measurement resources corresponding to the N CSIs, N being an integer greater than or equal to 2.

It should be understood that the CSI in the embodiment of the present disclosure can be understood as a CSI report.

In an implementation, the first information may be DCI.

Specifically, the first information is specifically configured to indicate a PUSCH time domain resource to be used when the CSIs are fed back, and the PUSCH time domain resource include: a slot location, a starting symbol and lasting symbols.

For example, the PUSCH time domain resource indicated by the first information includes: slot 1, a starting symbol at symbol 3, and lasting for 9 symbols.

It should be understood that a symbol in the embodiment of the present disclosure may be an orthogonal frequency-division multiplexing (OFDM) symbol.

In an implementation, the second information may be one of DCI, RRC dedicated specific signaling and MAC CE.

Specifically, the second information is specifically configured to indicate channel measurement and interference measurement time domain resources corresponding to the N CSIs, where the channel measurement and interference measurement time domain resources include a slot location, a starting symbol and lasting symbols.

For example, the channel measurement and interference measurement time domain resources indicated by the second information include: slot 2, a starting symbol at symbol 0 and lasting for 11 symbols.

In an implementation, the channel measurement and interference measurement resources indicated by the second information may be periodic resources, quasi-periodic resources or aperiodic resources.

It should be noted that periodic channel measurement and interference measurement resources may be pre-configured, for example, the period resources may be semi-statically configured. Quasi-periodic channel measurement and interference measurement resources may also be pre-configured, but need to be triggered by signaling (for example, MAC CE) to be effective. Aperiodic channel measurement and interference measurement resources need to be dynamically allocated, for example, the aperiodic resources may be dynamically allocated by DCI signaling or RRC signaling.

In implementation, the network device may send the first information and the second information to the terminal device by PDCCH.

In an implementation, if both the first information and the second information are DCI, the first information and the second information may be the same information.

It should be understood that a CSI corresponds to a set of channel measurement and interference measurement resources. The channel measurement and interference measurement resources may be understood as a channel measurement resource and an interference measurement resource.

In an implementation, the subcarrier spacings (numerologies) of the channel measurement and interference measurement resources corresponding to different CSIs of the N CSIs may be different, and the subcarrier spacings (numerologies) of a set of channel measurement resources and interference measurement resources corresponding to a CSI report are the same.

It should be noted that when the subcarrier spacings of channel measurement and interference measurement resources corresponding to different CSIs of the N CSIs are different, the calculation time required for each CSI of the N CSIs is obtained according to a time unit and a calculation time corresponding to a minimum subcarrier spacing of a subcarrier spacing of the channel measurement and interference measurement resources corresponding to each CSI of the N CSIs and a subcarrier spacings for reporting a PUSCH.

S220, the terminal device determines M CSIs that need to be fed back from the N CSIs according to the first information, the second information and M CSI processing units currently in an idle state, M being an integer greater than 0 and less than N.

It should be noted that the terminal device may determine CSIs that need to be fed back according to the number of CSI processing units currently in an idle state, where a CSI processing unit in the idle state corresponds to a CSI feedback. In other words, if the terminal device has only one CSI processing unit that is in the idle state currently, the terminal device will fed back only one CSI, even though the network device triggers the terminal device to feed back multiple CSIs.

In an implementation, the number of CSIs that can be fed back by the terminal device $M=N_{cpu}-L$, where $N_{cpu}$ is the number of CSIs that can be processed simultaneously, and L is the number of processing units currently occupied.

It should be noted that in the embodiments of the present disclosure, when a user's CSI processing capability is Type A, the calculation time required for M CSIs is a sum of the calculation time required for each CSI.

S230, the terminal device calculates the payloads of the M CSIs that need to be fed back, respectively, and feeds back the M CSIs that need to be fed back on the PUSCH resource.

It should be noted that the terminal device can reasonably allocate the PUSCH resource based on the payloads of M CSIs that need to be fed back, and then feed back the M CSIs that need to be fed back on the PUSCH resource.

Specifically, as an embodiment, in step 220.

the terminal device determines at least one first time span far CSI calculation, according to the first information, the second information and the M CSI processing units currently in the idle state;

the terminal device determines M CSIs that need to be fed back from the N CSIs according to the at least one first time span.

In an implementation, the terminal device may determine at least one CSI calculation time according to the first information, the second information and the M CSI processing units currently in idle state in the following manners.

Manner a, the terminal device determines a time span between a last symbol of a resource that appears first among the channel measurement and interference measurement resources corresponding to each CSI group of X CSI groups following a PDCCH, and a first symbol reported on a PUSCH as one first time span, to obtain X first time spans, where each CSI group includes M CSIs, and each CSI in the X CSI groups belongs to the N CSIs, X being an integer greater than or equal to 2.

Manner b, the terminal device determines a time span between a last symbol of a resource that appears first among the channel measurement and interference measurement resources corresponding to T CSIs in each CSI group of X CSI groups following a PDCCH, and a first symbol reported on a PUSCH as one first time span, to obtain X first time spans, where each CSI group includes M CSIs, and the channel measurement and, interference measurement resources corresponding to M-T CSIs included in each CSI group are periodic resources or quasi-periodic resources, and the terminal device has already cached downlink channel information corresponding to the M-T CSIs before receiving the first information and the second information, and each CSI in the X CSI groups belongs to the N CSIs. X being an integer greater than or equal to 2, and T being an integer greater than 0 and less than M.

In an implementation, $X=C_N^M$ in the manner a and the manner b described above. For example, when M=3, and N=5, X=10.

Manner c, the terminal device determines a time span between a last symbol of a resource that appears first among the channel measurement and interference measurement resources corresponding to K CSIs of the N CSIs following a PDCCH, and a first symbol reported on a PUSCH as the first time span, where the channel measurement and interference measurement resources corresponding to N-K CSIs of the N CSIs are periodic resources or quasi-periodic resources, and the terminal device has already cached downlink channel information corresponding to the N-K CSIs before receiving the first information and the second information, K being an integer greater than 0 and less than N.

Manner d, the terminal device determines a time span between a last symbol of a resource that appears first among the channel measurement and interference measurement resources corresponding to the N CSIs following a PDCCH, and a first symbol reported on a PUSCH as the first time span, where the channel measurement and interference measurement resources corresponding to the N CSIs may be periodic resources, quasi-periodic resources, or aperiodic resources.

In an implementation, after obtaining the X first time spans based on the manner a and the manner b described above, the M CSIs that need to be fed back may be determined in the following manner e.

Manner e, the terminal device determines first time span(s) satisfying a first condition from the X first time spans, and takes M CSIs corresponding to each first time span satisfying the first condition as a CSI candidate, to obtain at least one CSI candidate, where the first condition is that a first time span is longer than or equal to a sum of respective calculation times of corresponding M CSIs;

the terminal device determines the M CSIs that need to be fed back from the at least one CSI candidate.

In an implementation, after obtaining the first time span based on the manner c and the manner d described above, the M CSIs that need to be fed back may be determined in the following manner f.

Manner f, the terminal device determines M CSIs which satisfy a second condition as a CSI candidate, to obtain at least one CSI candidate, where the second condition is that a sum of respective calculation times of the M CSIs is shorter than or equal to the first time span;

the terminal device determines the M CSIs that need to be led back from the at least one CSI candidate.

In an implementation, in the manner e and the manner f, the terminal device may determine the M CSIs that need to be fed back front the at least one CSI candidate in the following manners.

Manner g, the terminal device randomly selects a CSI candidate and determines that the CSI candidate is the M CSIs that need to be fed back.

Manner h, the terminal device selects, from the at least one CSI candidate, a CSI candidate with a maximum sum of calculation times required as the M CSIs that need to be fed back.

Manner i, the terminal device selects, from the at least one CSI candidate, a CSI candidate with a highest priority as the M CSIs that need to be fed back.

It should be noted that the terminal device may calculate priorities of the N CSIs, and thus, the priority of each CSI candidate may be determined.

For example, when M=2, CSI candidate 1 includes CSI 1 and CSI 2, and CSI candidate 2 includes CSI 3 and CSI 4, where the order of priorities of CSIs is: CSI 1>CSI 2>CSI 3>CSI 4. In this case, the terminal device may select CSI candidate 1 as the two CSIs that need to be fed back.

Manner j, the terminal device selects the M CSIs that need to be fed back from the at least one CSI candidate according to a CSI configuration order.

For example, when M=4, CSI candidate 1 includes CSI 1, CSI 2, CSI 4 and CSI 5, CSI candidate 2 includes CSI 2, CSI 3, CSI 4 and CSI 5, where the order of priorities of CSIs is: from CSI 1 to CSI 5. In this case, the terminal device may select CSI candidate 1 as the four CSIs that need to be fed back.

Manner k, the terminal device selects, from the at least one CSI candidate, a CSI candidate with a minimum sum of CSI payloads as the M CSIs that need to be fed back.

Manner l, the terminal device selects, from the at least one CSI candidate, a CSI candidate with a maximum sum of CSI payloads as the M CSIs that need to be fed back.

Manner m, the terminal device selects, from the at least one CSI candidate, a CSI candidate with a maximum sum of CSI payloads that the PUSCH resource can support as the M CSIs that need to be fed back.

Specifically, as an embodiment, in step 220, the terminal device calculates the priorities of the N CSIs, and selects sequentially, according to the order of the priorities, M CSIs with the highest priorities from the N CSIs as the M CSIs that need to be fed back.

For example, when N=5 and M=3, the order of priorities of CSI is: CSI 1>CSI 2>CSI 3>CSI 4>CSI 5. The terminal device firstly selects CSI 1, then selects CSI 2, and lastly selects CSI 3 according to the order of priorities, namely, the terminal device selects CSI 1, CSI 2 and CSI 3 sequentially from the five CSIs according to the order of priorities, as the three CSIs that need to be fed back.

In an implementation, in this embodiment, if the calculation time required for the M CSIs that need to be fed back is longer than the time span between the last symbol of the channel measurement and interference measurement resources corresponding to the M CSIs that need to be fed back and the first symbol reported on the PUSCH, the terminal device gives up on feeding back the M CSIs that need to be fed back. In other words, if the calculation time required for the M CSIs that need to be fed back is longer than the time span between the last symbol of the channel measurement and interference measurement resources corresponding to the M CSIs that need to be fed back and the first symbol reported on the PUSCH, the calculation time of the M CSIs that need to be fed back does not satisfy the feedback requirement. In this case, the terminal device gives up on executing step 230.

In an implementation, in this embodiment, if the sum of time spans from detecting a PDCCH to reporting a PUSCH that are respectively required for the M CSIs that need to be fed back is longer than the time span between the last symbol of the PDCCH and the first symbol reported on the PUSCH, the terminal device gives up on feeding back the M CSIs that need to be fed back. In other words, if the sum of time spans from detecting a PDCCH to reporting a PUSCH that are respectively required for the M CSIs that need to be fed back is longer than the time span between the last symbol of the PDCCH and the first symbol reported on the PUSCH, the sum of time spans from detecting a PDCCH to reporting a PUSCH that are respectively required for the M CSIs that need to be led back does not satisfy the feedback requirement. In this case, the terminal device gives up on executing step 230.

Specifically, as an embodiment, in step 220, the terminal device selects, according to an order of configuring the N CSIs, the M CSIs that are configured first from the N CSIs as the M CSIs that need to be fed back.

For example, when N=5 and M=3, the CSI configuration order from CSI 1 to CSI 5, and the terminal device selects CSI 1, CSI 2 and CSI 3 as the three CSIs that need to be fed back according, to the configuration order.

In an implementation, in this embodiment, if the calculation time required for the M CSIs that need to be fed back is longer than the time span between the last symbol of the channel measurement and interference measurement resources corresponding to the M CSIs that need to be fed back and the first symbol reported on the PUSCH, the terminal device gives up on feeding back the M CSIs that need to be fed back. In other words, if the calculation time required for the M CSIs that need to be fed back is longer than the time span between the last symbol of the channel measurement and interference measurement resources corresponding to the M CSIs that need to be fed back and the first symbol reported on the PUSCH, the calculation time of the M CSIs that need to be fed back does not satisfy the feedback requirement. In this case, execution of step 230 is given up.

In an implementation, in this embodiment, if the sum of time spans from detecting a PDCCH to reporting, a PUSCH that are respectively required for the M CSIs that need to be fed back is longer than the time span between the last symbol of the PDCCH and the first symbol reported on the PUSCH, the terminal device gives up on feeding back the M CSIs that need to be fed back. In other words, if the sum of time spans from detecting a PDCCH to reporting a PUSCH that are respectively required for the M CSIs that need to be fed back is longer than the time span between the last symbol of the PDCCH and the first symbol reported on the PUSCH, the sum of time spans from detecting a PDCCH to reporting a PUSCH that are respectively required for the M CSIs that need to be fed back does not satisfy the feedback requirement. In this case, the terminal device gives up on executing step 230.

The wireless communication method 200 in embodiments of the present disclosure is described below in conjunction with specific embodiments.

In an implementation, as an embodiment, as shown in Table 1, a terminal device receives a first message and a second message transmitted by a network device, the first message triggers the terminal device to feed back two CSI reports (CSI 1 and CSI 2), the second message indicates channel measurement and interference measurement time domain resources corresponding to CSI 1 and CSI 2, respectively, where, with respect to CSI 1, the calculation time Z' required is 10 symbols, the distance between the first symbol following a PDCCH and the first symbol of a PUSCH is 13 symbols, the distance between the first symbol following the PDCCH and the last symbol of channel measurement and interference measurement resources is 2 symbols, the distance between the last symbol of the channel measurement and interference measurement resources and the first symbol of the PUSCH is 11 symbols; with respect to CSI 2, the calculation time Z' required is 5 symbols, the distance between the first symbol following the PDCCH and the first symbol of the PUSCH is 13 symbols, the distance between the first symbol following the PDCCH and the last symbol of the channel measurement and interference measurement resources is 6 symbols, and the distance between the last symbol of the channel measurement and interference measurement resources and the first symbol of the PUSCH is 7 symbols. At this time, the terminal device has only one CSI processing unit in the idle state, so the terminal device needs to select one of CSI 1 and CSI 2 to feed back.

measurement resources corresponding to CSI 2 and the first symbol of the PUSCH. Then, the terminal device may determine CSI 2 as a CSI that needs to be fed back according to the manner f described above.

It should be noted that, as illustrated in FIG. 3, there may exists channel measurement and interference measurement time domain resources, CSI calculation time and some other time domain resources between a PDCCH and a PUSCH. With respect to CSI 1, the rust symbol following the PDCCH is a time domain resource for implementing other functions, the second symbol following the PDCCH is the channel measurement and interference measurement time domain resources corresponding to CSI 1, and meanwhile, a time domain resource that may be used for CSI calculation may be symbols (11 symbols) between the last, symbol of the channel measurement and interference measurement time domain resources and the first symbol of the PUSCH; with respect to CSI 2, the first three symbols following the PDCCH are the time domain resource for implementing other functions, the fourth symbol, the fifth symbol and the sixth symbol following the PDCCH are the channel measurement and interference measurement time domain resources corresponding to CSI 2, and meanwhile, the time domain resource that may be used for CSI calculation may be symbols (7 symbols) between the last symbol of the channel measurement and interference measurement time domain resources and the first symbol of the PUSCH.

It should be understood that, in Table 1, the resource for channel measurement may be a Channel State Information Reference Signal (CSI-RS), the resource for interference measurement may be a Channel State Information Interference Measurement (CSI-IM) resource. In addition, the channel measurement and interference measurement time domain resources may be aperiodic (AP) type resources.

TABLE 1

| CSI reports that a first message triggers a terminal device to feedback | Distance between the first symbol following a PDCCH and the first symbol of a PUSCH | Channel measurement and interference measurement resources | Distance between the first symbol following a PDCCH and the last symbol of channel measurement and interference measurement resources | Calculation time Z' | Distance between the last symbol of channel measurement and interference measurement resources and the first symbol of a PUSCH |
|---|---|---|---|---|---|
| CSI 1 | 13 | AP CSI-RS/CSI-IM | 2 | 10 | 11 |
| CSI 2 | 13 | AP CSI-RS/CSI-IM | 6 | 5 | 7 |

For example, the terminal device may, according to the manner a or the manner b described above, determine two first time spans which respectively are the distance (11 symbols) between the last symbol of the channel measurement and interference measurement resources corresponding to CSI 1 and the first symbol of the PUSCH, and the distance (7 symbols) between the last symbol of the channel measurement and interference measurement resources corresponding to CSI 2 and the first symbol of the PUSCH. Then the terminal device may, according to the manner e described above, determine that both CSI 1 and CSI 2 satisfy the feedback condition. And lastly, the terminal device may, based on any manner of the manner g to the manner at, select one CSI from CSI 1 and CSI 2 to feed back.

For another example, the terminal device may, according to the manner c or the manner d described above, determine a first time span which is the distance (7 symbols) between the last symbol of the channel measurement and interference In an implementation, as an embodiment, as shown in Table 2, a terminal device receives a first message and a second message transmitted by a network device, the first message triggers the terminal device to feed back five CSI reports (CSI 1, CSI 2, CSI 3, CSI 4 and CSI 5), the second message indicates channel measurement and interference measurement time domain resources corresponding to CSI 1, CSI 2, CSI 3, CSI 4 and CSI 5, respectively, where, with respect to CSI 1, the calculation time Z' required is 5 symbols, the distance between the first symbol following a PDCCH and the first symbol of a PUSCH is 20 symbols, the distance between the first symbol following the PDCCH and the last symbol of channel measurement and interference measurement resources is 1 symbol, and the distance between the last symbol of the channel measurement, and interference measurement resources and the first symbol of the PUSCH is 19 symbols; with respect to CSI 2, the calculation time Z' required is 5 symbols, the distance between the first symbol following the PDCCH and the first symbol of the PUSCH is 20 symbols, the distance between the first symbol following the PDCCH and the last symbol of the channel measurement and interference measurement resources is 2 symbols, and the distance between the last symbol of the channel measurement and interference measurement resources and the first symbol of the PUSCH is 18 symbols; with respect to CSI 3, the calculation time Z' required is 5 symbols, the distance between the first symbol following the PDCCH and the first symbol of the PUSCH is 20 symbols, the distance between the first symbol following the PDCCH and the last symbol of the channel measurement and interference measurement resources is 3 symbols, and the distance between the last symbol of the channel measurement and interference measurement resources and the first symbol of the PUSCH is 17 symbols; with respect to CSI 4, the calculation time Z' required is 10 symbols, the distance between the first symbol following the PDCCH and the first symbol of the PUSCH is 20 symbols, the distance between the first symbol following the PDCCH and the last symbol of the channel measurement and interference measurement resources is 4 symbols, and the distance between the last symbol of the channel measurement and interference measurement resources and the first symbol of the PUSCH is 16 symbols; and with respect to CSI 5, the calculation time Z' required is 10 symbols, the distance between the first symbol following the PDCCH and the first symbol of the PUSCH is 20 symbols, the distance between the first symbol following the PDCCH and the last symbol of the channel measurement and interference measurement resources is 4 symbols, the distance between the last symbol of the channel measurement and interference measurement resources and the first symbol of the PUSCH is 16 symbols. At this time, the terminal device has only three CSI processing units in the idle state, so the terminal device needs to select three from CSI 1, CSI 2, CSI 3, CSI 4 and CSI 5 to feed back.

For example, the terminal device may, according to the manner a or the manner b described above, determine three first time spans which, respectively, are the distance (17 symbols) between the last symbol of the channel measurement and interference measurement resources corresponding to CSI 3 and the first symbol of the PUSCH, the distance (16 symbols) between the last symbol of the channel measurement and interference measurement resources corresponding to CSI 4 and the first symbol of the PUSCH, and the distance (16 symbols) between the last symbol of the channel measurement and interference measurement resources corresponding to CSI 5 and the first symbol of the PUSCH. Then, the terminal device may, according to the manner e described above, determine that only CSI 1, CSI 2 and CSI 3 satisfy the feedback condition, and the terminal device may feed back CSI 1, CSI 2 and CSI 3.

It should be noted that, as illustrated in FIG. 4, there may exists channel measurement and interference measurement time domain resources, CSI calculation time and some other time domain resources between a PDCCH and a PUSCH. With respect to CSI 1, the first symbol following the PDCCH is the channel measurement and interference measurement time domain resources corresponding to CSI 1, and meanwhile the time domain resource that may be used for CSI calculation may be symbols (19 symbols) between the last symbol of the channel measurement and interference measurement time domain resources and the first symbol of the PUSCH with respect to CSI 2, the first symbol following the PDCCH is the time domain resource for implementing other functions, the second symbol following the PDCCH is the channel measurement and interference measurement time domain resources corresponding to CSI 2, and meanwhile the time domain resource that may be used for CSI calculation may be symbols (18 symbols) between the last symbol of the channel measurement and interference measurement time domain resources and the first symbol of the PUSCH; with respect to CSI 3, the first symbol following the PDCCH is the time domain resource for implementing other functions, the second symbol and the third symbol following the PDCCH are the channel measurement and interference measurement time domain resources corresponding to CSI 3, and meanwhile the time domain resource that may be used for CSI calculation may be symbols (17 symbols) between the last symbol of the channel measurement and interference measurement time domain resources and the first symbol of the PUSCH; with respect to CSI 4, the first symbol following the PDCCH is the time domain resource for implementing other functions, the second symbol, the third symbol and the fourth symbol following the PDCCH are the channel measurement and interference measurement time domain resources corresponding to CSI 4, and meanwhile the time domain resource that may be used for CSI computing may be symbols (16 symbols) between the last symbol of the channel measurement and interference measurement time domain resources and the first symbol of the PUSCH with respect to CSI 5, the first symbol and the second symbol following the PDCCH are the time domain resource for implementing other functions, the third symbol and the fourth symbol following the PDCCH are the channel measurement and interference measurement time domain resources corresponding to CSI 5, and meanwhile the time domain resource that may be used for CSI computing may be symbols (16 symbols) between the last symbol of the channel measurement and interference measurement time domain resources and the first symbol of the PUSCH.

It should be understood that, in Table 2, the resource for channel measurement may be a CSI-RS, the resource for interference measurement may be a CSI-IM resource. Meanwhile, the channel measurement and interference measurement time domain resources may be AP type resources.

TABLE 2

| CSI reports that a first message triggers a terminal device to feedback | Distance between the first symbol following a PDCCH and the first symbol of a PUSCH | Channel measurement and interference measurement resource | Distance between the first symbol following a PDCCH and the last symbol of channel measurement and interference measurement resource | Calculation time Z' | Distance between the last symbol of channel measurement and interference measurement resource and the first symbol of a PUSCH |
|---|---|---|---|---|---|
| CSI 1 | 20 | AP CSI-RS/CSI-IM | 1 | 5 | 19 |
| CSI 2 | | | 2 | 5 | 18 |
| CSI 3 | | | 3 | 5 | 17 |
| CSI 4 | | | 4 | 10 | 16 |
| CSI 5 | | | 4 | 10 | 16 |

In an implementation, as an embodiment, as shown in Table 3, a terminal device receives a first message and a second message transmitted by a network device, the first message triggers the terminal device to feed back five CSI reports (CSI 1, CSI 2, CSI 3, CSI 4 and CSI 5), the second message indicates channel measurement and interference measurement time domain resources corresponding to CSI 1, CSI 2, CSI 3, CSI 4 and CSI 5, respectively, where, with respect to CSI 1, the calculation time Z' required is 5 symbols, the distance between the first symbol following, a PDCCH and the first symbol of a PUSCH is 25 symbols, the distance between the first symbol following the PDCCH and the last symbol of channel measurement and interference measurement resources is 1 symbol, and the distance between the last symbol of the channel measurement and interference measurement resources and the first symbol of the PUSCH is 24 symbols with respect to CSI 2, the calculation time Z' required is 5 symbols, the distance between the first symbol following the PDCCH and the first symbol of the PUSCH is 25 symbols, the distance between the first symbol following the PDCCH and the last symbol of the channel measurement and interference measurement resources is 2 symbols, and the distance between the last symbol of the channel measurement and interference measurement resources and the first symbol of the PUSCH is 23 symbols with respect to CSI 3, the calculation time Z' required is 5 symbols, the distance between the first symbol following the PDCCH and the first symbol of the PUSCH is 25 symbols, the distance between the first symbol following, the PDCCH and the last symbol of the channel measurement and interference measurement resources is 3 symbols, and the distance between the last symbol of the channel measurement and interference measurement resources and the first symbol of the PUSCH is 22 symbols; with respect to CSI 4, the calculation time Z' required is 10 symbols, the distance between the first symbol following the PDCCH and the first symbol of the PUSCH is 25 symbols, the distance between the first symbol following the PDCCH and the last symbol of the channel measurement and interference measurement resources is 4 symbols, and the distance between the last symbol of the channel measurement and interference measurement resources and the first symbol of the PUSCH is 21 symbols; with respect to CSI 5, the calculation time Z' required is 10 symbols, the distance between the first symbol following the PDCCH and the first symbol of the PUSCH is 25 symbols, the distance between the first symbol following the PDCCH and the last symbol of the channel measurement and interference measurement resources is 4 symbols, and the distance between the last symbol of the channel measurement and interference measurement resources and the first symbol of the PUSCH is 21 symbols. At this time, the terminal device has only three CSI processing units in the idle state, so the terminal device needs to select three from CSI 1, CSI 2, CSI 3, CSI 4 and CSI 5 to feed back.

For example, the terminal device may, according to the manner a or the manner b described above, determine three first time spans which, respectively, are the distance (22 symbols) between the last symbol of the channel measurement and interference measurement resources corresponding to CSI 3 and the first symbol of the PUSCH, the distance symbols) between the last symbol of the channel measurement and interference measurement resources corresponding to CSI 4 and the first symbol of the PUSCH, and the distance (21 symbols) between the last symbol of the channel measurement and interference measurement resource corresponding to CSI 5 and the first symbol of the PUSCH. Then the terminal device may, according to the manner e described above, determine the CSI candidates that satisfy the feedback condition include: CSI candidate 1 (CSI 1, CSI 2, and CSI 3), CSI candidate 2 (CSI 1, CSI 2, and CSI 4), CSI candidate 3 (CSI 1, CSI 2, and CSI 5), CSI candidate 4 (CSI 1, CSI 3, and CSI 4), CSI candidate 5 (CSI 1, CSI 3, and, CSI 5), CSI candidate 6 (CSI 2, CSI 3, and CSI 4), CSI candidate 7 (CSI 2, CSI 3, and CSI 5). And lastly, the terminal device may, based on any one of the manner f to the manner l, select one CSI candidate from CSI candidate 1 to CSI candidate 7 to feed back.

For another example, the terminal device may, according to the manner c or the manner d described above, determine a first time span which is the distance (21 symbols) between the last symbol of the channel measurement and interference measurement resources corresponding to CSI 4 or CSI 5 and the first symbol of the PUSCH. Then, the terminal device may, according to the manner f described above, determine the CSI candidates that satisfy the feedback condition include: CSI candidate 1 (CSI 1, CSI 2, and CSI 3), CSI candidate 2 (CSI 1, CSI 2, and CSI 4), CSI candidate 3 (CSI 1, CSI 2, and CSI 5), CSI candidate 4 (CSI 1, CSI 3, and CSI 4), CSI candidate 5 (CSI 1, CSI 3, and CSI 5), CSI candidate 6 (CSI 2, CSI 3, and CSI 4), CSI candidate 7 (CSI 2, CSI 3, and CSI 5). And lastly, the terminal device may, based on any one of the manner f to the manner l, select one CSI candidate from CSI candidate 1 to CSI candidate 7 to feed back.

Figure 5:
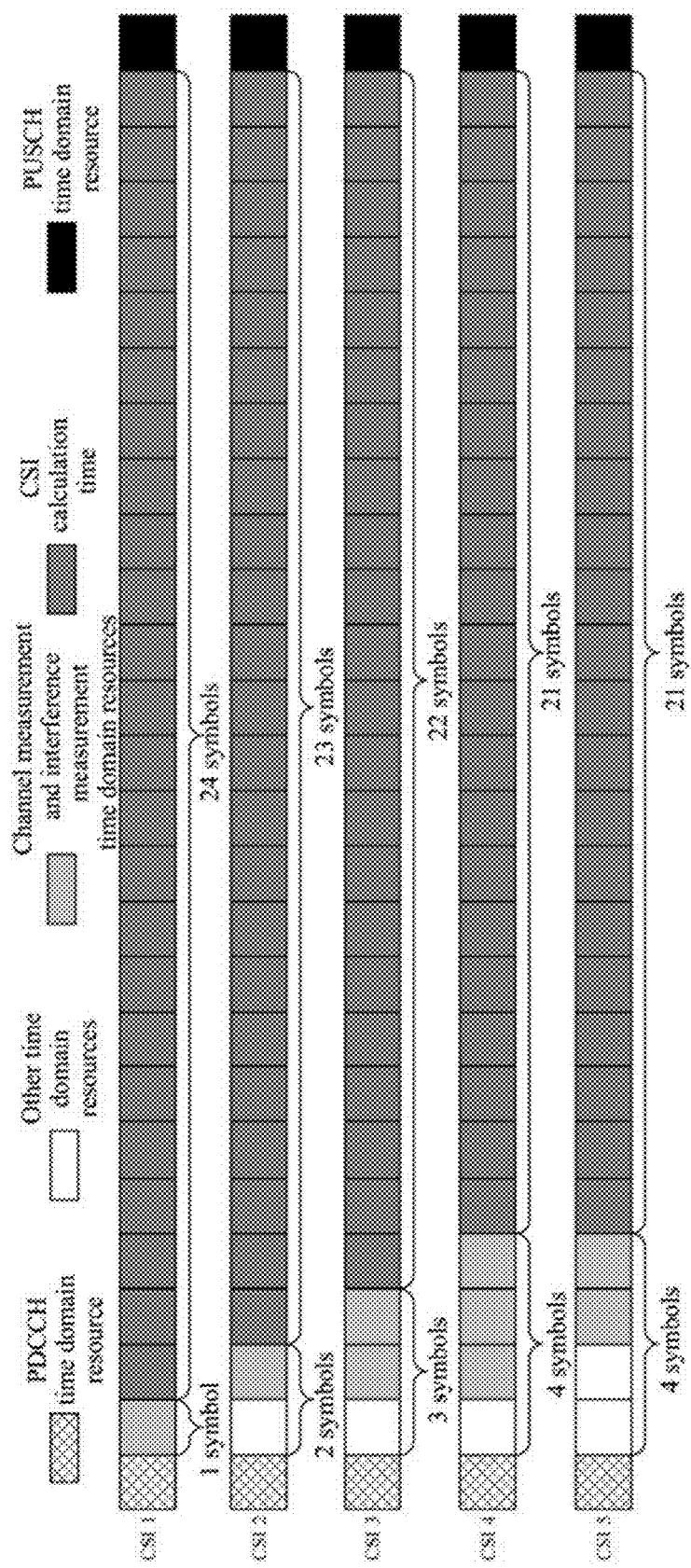
FIG. 5 is a schematic distribution map of time domain resources according to still another embodiment of the present disclosure.

It should be noted that, as illustrated in FIG. 5, there may exists channel measurement and interference measurement time domain resources, CSI calculation time and some other time domain resources between a PDCCH and a PUSCH. With respect to CSI 1, the first symbol following the PDCCH is the channel measurement and interference measurement time domain resources corresponding to CSI 1, and the time domain resource that may be used for CSI calculation may be symbols (24 symbols) between the last symbol of the channel measurement and interference measurement time domain resources and the first symbol of the PUSCH, with respect to CSI 2, the first symbol following the PDCCH is the time domain resource for implementing other functions, the second symbol following the PDCCH is the channel measurement and interference measurement time domain resources corresponding to CSI 2, and the time domain resource that may be used for CSI calculation may be symbols (23 symbols) between the last symbol of the channel measurement and interference measurement time domain resources and the first symbol of the PUSCH; with respect to CSI 3, the first symbol following the PDCCH is the time domain resource for implementing other functions, the second symbol and the third symbol following the PDCCH are the channel measurement and interference measurement time domain resources corresponding to CSI, and the time domain resource that may be used for CSI calculation may be symbols (22 symbols) between the last symbol of the channel measurement and interference measurement time domain resources and the first symbol of the PUSCH, with respect to CSI 4, the first symbol following the PDCCH is the time domain resource for implementing other functions, the second symbol, the third symbol and the fourth symbol following the PDCCH are the channel measurement and interference measurement time domain resources corresponding to CSI 4, and the time domain resource that may be used for CSI calculation may be symbols (21 symbols) between the last symbol of the channel measurement and interference measurement time domain resources and the first symbol of the PUSCH; with respect to CSI 5, the first symbol and the second symbol following the PDCCH are the time domain resource for implementing other functions, the third symbol and the fourth symbol following the PDCCH are the channel measurement and interference measurement time domain resources corresponding to CSI 5, and the time domain resource that may be used for CSI calculation may be symbols (2 symbols) between the last symbol of the channel measurement and interference measurement time domain resources and the first symbol of the PUSCH.

It should be understood that, in Table 3, the resource for channel measurement may be a CSI-RS, the resource for interference measurement may be a CSI-IM resource. Meanwhile, the channel measurement and interference measurement time domain resources may be AP type resources.

In an implementation, the channel measurement and interference measurement resources indicated by the second information are one type among periodic resources, quasi-periodic resources and aperiodic resources.

In an implementation, when subcarrier spacings of the channel measurement and interference measurement resources corresponding, to different CSIs of the N CSIs are different, the calculation time required for each CSI of the N CSIs is obtained according to a time unit and a calculation time corresponding to a minimum subcarrier spacing of a subcarrier spacing of the channel measurement and interference measurement resources corresponding to each CSI of the N CSIs and a subcarrier spacing for reporting a PUSCH.

TABLE 3

| CSI reports that a first message triggers a terminal device to feed back | Distance between the first symbol following a PDCCH and the first symbol of a PUSCH | Channel measurement and interference measurement resources | Distance between the first symbol following a PDCCH and the last symbol of channel measurement and interference measurement resources | Calculation time Z' | Distance between the last symbol of channel measurement and interference measurement resources and the first symbol of a PUSCH |
|---|---|---|---|---|---|
| CSI 1 | 25 | AP CSI-RS/CSI-IM | 1 | 5 | 24 |
| CSI 2 | | | 2 | 5 | 23 |
| CSI 3 | | | 3 | 5 | 22 |
| CSI 4 | | | 4 | 10 | 21 |
| CSI 5 | | | 4 | 10 | 21 |

Therefore, in the embodiments of the recent disclosure, the network device triggers the terminal device to feed back N aperiodic CSIs, while the terminal device has only M CSI processing units currently in the idle state, the terminal device determines M CSIs that need to be fed back from the N CSIs, and feeds back on the PUSCH resource indicated by the network device, and thus, the feeding back of CSI can be performed with more flexibility.

Is a schematic flowchart of a wireless communication method 300 according to an embodiment of the present disclosure. The method 300 may in an implementation applied to, but not limited to being applied to, the system illustrated in FIG. 1. The method 300 includes at least part of the following contents.

S310, a network device transmits first information and second information to a terminal device, where the first information is configured to trigger the terminal device to feed back aperiodic N CSIs, and to indicate a PUSCH resource to be used when the CSIs are fed back, the second information is configured to indicate channel measurement and interference measurement resources corresponding to the N CSIs, the terminal device has M CSI processing units in an idle state currently, N being an integer greater than or equal to 2, and M being an integer greater than 0 and less than N.

S320, the network device receives M CSIs led back by the terminal device on the PUSCH resource.

In an implementation, the first information is specifically configured to indicate the PUSCH time domain resource to be used when the CSIs are fed back, where the PUSCH time domain resource includes a slot location, a starting symbol and lasting symbols.

In an implementation, the second information is specifically configured to indicate the channel measurement and interference measurement time domain resources corresponding to the N CSIs, where the channel measurement and interference measurement time domain resources include a slot location, a starting symbol and lasting symbols.

In an implementation, the first information is DCI, and the second information is one of DCI, RRC dedicated signaling or MAC CE.

It should be understood that, for the steps in the wireless communication method 300, the corresponding steps in the wireless communication method 200 may be referred to, which is not repeated for brevity.

Therefore, in the embodiment of the present disclosure, the network device triggers the terminal device to teed back N aperiodic CSIs, while the terminal device has only M CSI processing units currently in the idle state, the terminal device determines M CSIs that need to be fed back from the N CSIs, and feeds back on the PUSCH resource indicated by the network device, and thus, the feeding back of CSI is performed with more flexibility.

FIG. 7 is a schematic block diagram of a terminal device 400 according to an embodiment of the present disclosure. As illustrated in FIG. 7, the terminal device 400 includes:

a communicating unit 410, configured to receive first information and second information transmitted by a network device, where the first information is configured to trigger the terminal device to feed back aperiodic N CSIs, and to indicate a PUSCH resource to be used when the CSIs are fed back, the second information is configured to indicate channel measurement and interference measurement resources corresponding to the N CSIs, N being an integer greater than or equal to 2;

a processing unit 420, configured to determine M CSIs that need to be fed back from the N CSIs according to the first information, the second information and M CSI processing units currently in an idle state. M being an integer greater than 0 and less than N;

the processing unit 420, further configured to calculate payloads of the M CSIs that need to be fed back, respectively, and control the communicating unit 410 to feed back the M CSIs that need to be fed back on the PUSCH resource.

In an implementation, the processing unit 420 is specifically configured to:

determine at least one first time span for CSI calculation according to the first information, the second information and the M CSI processing units currently in the idle state; and determine the M CSIs that need to be fed back from the N CSIs according to the at least one first time span.

In an implementation, the processing unit 420 is specifically configured to:

determine a time span between a last symbol of a resource that appear first among channel measurement and interference measurement resources corresponding to each (CSI group of X CSI groups following a PDCCH, and a first symbol reported on a PUSCH as one first time span, to obtain X first time spans, where each CSI group includes M CSIs, and each CSI in the X CSI groups belongs to the N CSIs, X being an integer greater than or equal to 2.

In an implementation, the processing unit 420 is specifically configured to:

determine a time span between a last symbol of a resource that appears first among channel measurement and interference measurement resources corresponding to T CSIs in each CSI group of X CSI groups following a PDCCH, and a first symbol reported on a PUSCH as one first time span, to obtain X first time spans, where each CSI group includes M CSIs, and channel measurement and interference measurement resources corresponding to M-T CSIs included in each CSI group are periodic resources or quasi-periodic resources, and the terminal device has already cached downlink channel information corresponding to the M-T CSIs before receiving the first information and the second information, and each CSI in the X CSI groups belongs to the N CSIs, X being an integer greater than or equal to 2, and T being an integer greater than 0 and less than M.

In an implementation, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting the PUSCH.

In an implementation, the processing unit 420 is specifically configured to:

determine at least one first time span satisfying a first condition from the X first time spans, and taking M CSIs corresponding to each of the at least on first time span satisfying the first condition as a CSI candidate, to obtain at least one CSI candidate, where the first condition is that the first time span is longer than or equal to a sum of respective calculation times of corresponding M CSIs; and determine the M CSIs that need to be fed back from the at least one CSI candidate.

In an implementation, the processing unit 420 is specifically configured to:

determine a time span between a last symbol of a resource that appears first among the channel measurement and interference measurement resources corresponding to K CSIs of the N CSIs following a PDCCH, and a first symbol reported on a PUSCH as the first time span, where the channel measurement and interference measurement resources corresponding to N-K CSIs of the N CSIs are periodic resources or quasi-periodic resources, and the terminal device has already cached downlink channel information corresponding to the N-K CSIs before receiving the first information and the second information, K being an integer greater than 0 and less than N.

In an implementation, the processing unit 420 is specifically configured to:

determine a time span between a last symbol of a resource that appears first among the channel measurement and interference measurement resources corresponding to the N CSIs following a PDCCH, and a first symbol reported on a PUSCH as the first time span, where the channel measurement and interference measurement resources corresponding to the N CSIs may be periodic resources, quasi-periodic resources, or aperiodic resources.

In an implementation, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing, of channel measurement and interference measurement resources corresponding to each CSI of the N CSIs and a subcarrier spacing for reporting the PUSCH.

In an implementation the processing unit 420 is specifically configured to:

determine M CSIs which satisfy a second condition as a CSI candidate, to obtain at least one CSI candidate, where the second condition is that a sum of respective calculation times of the M CSIs is shorter than or equal to the first time span; and determine the M CSIs that need to be fed back from the at least one CSI candidate.

In an implementation, the processing unit 420 is specifically configured to:

select, from the at least one CSI candidate, a CSI candidate with a maximum sum of calculation times required as the M CSIs that need to be fed back; or select, from the at least one CSI candidate, a CSI candidate with a highest priority as the M CSIs that need to be fed back; or select, from the at least one CSI candidate, the M CSIs that need to be fed back according to a CSI configuration order; or select, from the at least one CSI candidate, a CSI candidate with a minimum sum of CSI payloads as the M CSIs that need to be fed back; or select, from the at least one CSI candidate, a CSI candidate with a maximum sum of CSI payloads as the M CSIs that need to be fed back; or select, from the at least one CSI candidate, a CSI candidate with a maximum sum of CSI payloads that the PUSCH resource can support as the M CSIs that need to be fed back.

In an implementation, the processing unit 420 is specifically configured to:

calculate priorities of the N CSIs, and select sequentially, according to the order of the priorities, M CSIs with highest priorities from the N CSIs as the M CSIs that need to be fed back.

In an implementation, the processing unit 420 is specifically configured to:

select, according to an order of configuring the N CSIs, the M CSIs that are configured first from the N CSIs as M CSIs that need to be fed back.

In an implementation, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of subcarrier spacing of channel measurement and interference measurement resources corresponding to each CSI of the N CSIs and a subcarrier spacing for reporting the PUSCH.

In an implementation, if a calculation time required for the M CSIs that need to be fed back is longer than a time span between a last symbol of channel measurement and interference measurement resources corresponding to the M CSIs that need to be fed back and a first symbol reported on a PUSCH, the processing unit 420 is further configured to give up on feeding back the M CSIs that need to be fed back.

In an implementation, if a sum of time spans from detecting a PDCCH to reporting a PUSCH that are respectively required for the M CSIs that need to be fed back is longer than a time span between a last symbol of a PDCCH and a first symbol reported on a PUSCH, the processing unit 420 is specifically configured to give up on feeding back the M CSIs that need to be fed back.

In an implementation, the first information is specifically configured to indicate a PUSCH time domain resource to be used when the CSIs are fed back, where the PUSCH time domain resource includes: a slot location, a starting symbol and lasting symbols.

In an implementation, the second information is specifically configured to indicate channel measurement and interference measurement time domain resources corresponding to the N CSIs, where the channel measurement and interference measurement time domain resources include a slot location, a starting, symbol and lasting symbols.

In an implementation, the channel measurement and interference measurement resources indicated by the second information are one type among periodic resources, quasi-periodic resources and aperiodic resources.

In an implementation, the first information is DCI, and the second information is one of DCI, RRC dedicated signaling or MAC CE.

It should be understood that the above-mentioned and other operations and/or functions of the respective modules in the terminal device 400 according to the embodiment of the present disclosure are to implement the corresponding processes of the terminal device in the method 200 illustrated in FIG. 2, respectively, and will not be repeated here for brevity.

FIG. 8 is a schematic diagram of a network device 500 according to an embodiment of the present disclosure. As illustrated in FIG. 8, the network device 500 includes:

a communicating unit 510, configured to transmit first information and second information to a terminal device, where the first information is configured to trigger the terminal device to feed back aperiodic N CSIs, and to indicate a PUSCH resource to be used when the CSIs are fed back, the second information is configured to indicate channel measurement and interference measurement resources corresponding to the N CSIs, and the terminal device has M CSI processing units in an idle state currently, N being an integer greater than or equal to 2 and M being an integer greater than 0 and less than N;

the communicating unit 510, further configured to receive M CSIs fed back by the terminal device on the PUSCH resource.

In an implementation, the first information is specifically configured to indicate a PUSCH time domain resource to be used when the CSIs are fed back, where the PUSCH time domain resource includes: a slot location, a starting symbol and lasting symbols.

In an implementation, the second information is specifically configured to indicate channel measurement and interference measurement, time domain resources corresponding to the N CSIs, where the channel measurement and interference measurement time domain resources include a slot location, a starting symbol and lasting symbols.

In an implementation, the channel measurement and interference measurement resources indicated by the second information are one type among periodic resources, quasi-periodic resources and aperiodic resources.

In an implementation, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting, the PUSCH.

In an implementation, the first information is DCI, and the second information is one of DCI, RRC dedicated signaling or MAC CE.

It should be understood that the above-mentioned and other operations and/or functions of the respective modules in the network device 500 according to the embodiment of the present disclosure implement the corresponding processes of the network device in the method 300 illustrated in FIG. 6, respectively, and will not be repeated here for brevity.

Figure 9:
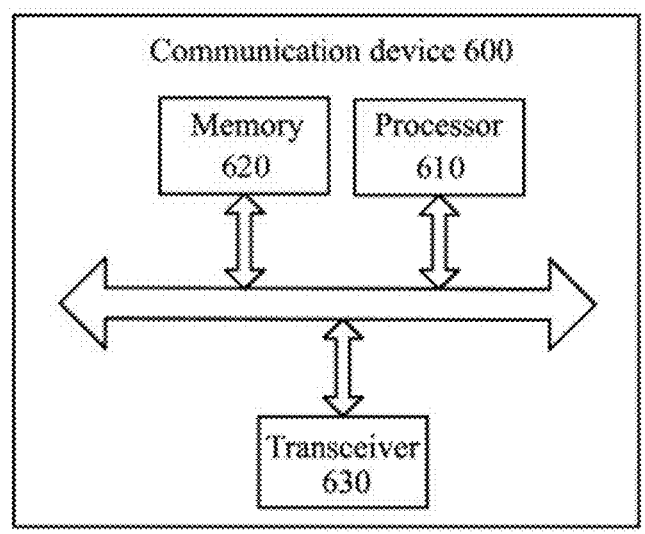
FIG. 9 is a schematic block diagram of a communication device according to an embodiment of the present disclosure.

FIG. 9 is a schematic block diagram of a communication device 600 according to an embodiment of the present disclosure. The communication device 600 illustrated in FIG. 9 includes a processor 610, and the processor 610 can call and run a computer program from a memory, so as to implement the method according to the embodiments of the present disclosure.

In an implementation, as illustrated in FIG. 9, the communication device 600 may further includes a memory 620, where the processor 610 can call and run a computer program from the memory 620, so as to implement the method according to the embodiments of the present disclosure.

The memory 620 may be a discrete device independent from the processor 610, or be integrated in the processor 610.

In an implementation, as illustrated in FIG. 9, the communication device 600 may further include a transceiver 630, the processor 610 can control the transceiver 630 to communicate with another device, specifically, to transmit information or data to another device, or to receive information or data transmitted by another device.

The transceiver 630 may include a transmitter and a receiver. The transceiver 630 may further include an antenna, and there may be one or more antennae.

In an implementation, the communication device 600 may be the network device in the embodiments of the present disclosure, and the communication device 600 may implement the corresponding processes implemented by the network device in the respective methods of the embodiments of the present disclosure, which will not be repeated here for brevity.

In an implementation, the communication device 600 may be the terminal device in the embodiments of the present disclosure, and the communication device 600 may implement the corresponding processes implemented by the terminal device in the respective methods of the embodiments of the present disclosure, which will not be repeated here for brevity.

Figure 10:
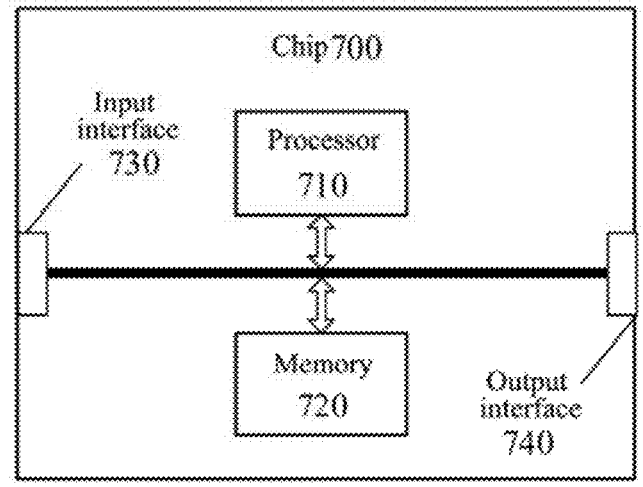
FIG. 10 is a schematic block diagram of a chip according to an embodiment of the present disclosure.

FIG. 10 is a schematic block diagram of a chip 700 according to an embodiment of the present disclosure. The chip 700 illustrated in FIG. 10 includes a processor 710, and the processor 710 can call and run a computer program from a memory, so as to implement the method according to the embodiments of the present disclosure.

In an implementation, as illustrated in FIG. 10, the chip 700 may further include a memory 720, and the processor 710 can call and run a computer program from the memory 720, so as to implement the method according to the embodiments of the present disclosure.

The memory 720 may be a discrete device independent from the processor 710, or be integrated in the processor 710.

In an implementation, the chip 700 may further include an input interface 730, and the processor 710 may control the input interface 730 to communicate with another device or chip, specifically, to obtain information or data transmitted by another device or chip.

In an implementation, the chip 700 may further include an, output interface 740, and the processor 710 may control the output interface 740 to communicate with another device or chip, specifically, to output information or data to another device or chip.

In an implementation, the chip may be applied to the network device in the embodiments of the present disclosure, and the chip may implement corresponding processes implemented by the network device in the respective methods of the embodiments of the present disclosure, which will not be repeated here for brevity.

In an implementation, the chip may be applied to the terminal device in the embodiments of the present disclosure, and the chip may implement corresponding processes implemented by the terminal device in the respective methods of the embodiments of the present disclosure, which will not be repeated here for brevity.

It should be understood that the chip mentioned in the embodiments of the present disclosure may also be referred to as a system level chip, a system chip, a chip system, a system on chip or the like.

The processor mentioned above may be a general purpose processor, a digital signal processor (DSP), a ready-made field programmable gate array (FPGA), an application specific integrated circuit (ASIC) or other programmable logic devices, transistor logic devices, discrete hardware components or the like. The general purpose processor may be a microprocessor or may be any conventional processor and the like.

The memory mentioned above may be a volatile memory or a non-volatile memory, or may include both a volatile and a non-volatile memory, where the non-volatile memory may be a read-only memory (ROM), a programmable read only memory (PROM), an erasable programmable read only memory (EPROM), an electrically erasable programmable read only memory (EEPROM) or a flash memory, and the volatile memory may be a random access memory (RAM).

It should be understood that the memories described above are illustrative but not limiting, for example, the memory in the embodiments of the present disclosure may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), an synchronous link dynamic random access memory (SLDRAM), a direct Rambus random access memory (DR RAM) or the like. That is, the memory in the embodiments of the present disclosure is intended to include, but not limited to, these and any other suitable types of memory.

Figure 11:
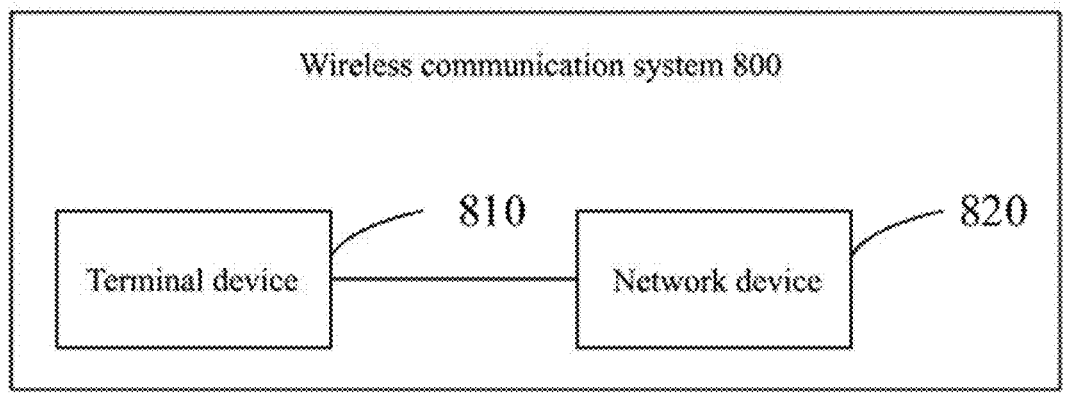
FIG. 11 is a schematic block diagram of a wireless communication system according to an embodiment of the present disclosure.

FIG. 11 is a schematic diagram of a wireless communication system 800 according to an embodiment of the present disclosure. As illustrated in FIG. 11, the wireless communication system 800 includes a terminal device 810 and a network device 820. The terminal device 810 is configured to receive first information and second information transmitted by the network device, where the first information is configured to trigger the terminal device to feed back aperiodic N CSIs, and to indicate a PUSCH resource to be used when feeding back the CSIs, and the second information is configured to indicate channel measurement and interference measurement resources corresponding to the N CSIs, N being an integer greater than or equal to 2; determine M CSIs that need to be fed back from the N CSIs according to the first information, the second information and M CSI processing units currently in an idle state, M being an integer greater than 0 and less than N; calculate payloads of the M CSIs that need to be fed back, respectively, and feed back the M CSIs that need to be fed back on the PUSCH resource. The network device 820 is configured to transmit the fast information and the second information to the terminal device, where the first information is configured to trigger the terminal device to feed back the aperiodic N CSIs, and to indicate the PUSCH resource to be used when the CSIs are fed back, the second information is configured to indicate the channel measurement and interference measurement resources corresponding to the N CSIs, and the terminal device has M CSI processing, units in the idle state currently, N being an integer greater than or equal to 2 and M being an integer greater than 0 and less than N; and receive the M CSIs fed back by the terminal device on the PUSCH resource.

The terminal device 810 may be applied to implement the corresponding functions implemented by the terminal device in the method 200 described above, and the structure of the terminal device 810 may be as illustrated by the terminal device 400 in FIG. 7, which will not be repeated here for brevity.

The network device 820 may be applied to implement the corresponding functions implemented by the network device in the method 300 described above, and the structure of the network device 820 may be as illustrated by the network device 500 in FIG. 8, which will not be repeated here for brevity.

The embodiments described above may be completely or partially implemented by software, hardware, firmware or any combination thereof. When implemented by software, it may be wholly or partially implemented in the form of a computer program product. The computer program product includes one or more computer instructions. When the computer program instructions are loaded and executed by a computer, the processes or functions described according to the embodiments of the present disclosure are carried out wholly or partially. The computer may be a general purpose computer, a special purpose computer, a computer network, or other programmable devices. The computer instructions may be stored in a computer readable storage medium, or be transmitted from one computer readable storage medium to another computer readable storage medium, for example, the computer instructions may be transmitted from a website, computer, server or data center to another website computer, server or data center by means of wired transmission (for example, by coaxial cable, optical fiber, or digital subscriber line (DSL) or wireless transmission (for example, by infrared ray, wireless, microwave or the like). The computer readable storage medium may be any available medium that can be accessed by a computer, or a data storage device such as a server, data center, or the like that includes one or more available media integrated in. The available medium may be a magnetic medium (for example, a floppy disk, a hard disk, or a magnetic tape), an optical medium (for example, a DVD), a semiconductor medium (for example, a Solid State Disk (SSD)) or the like.

It should be understood that, in the various embodiments of the present disclosure, the sequential numbers of the respective processes does not mean the order for execution, the order for execution of the respective processes is determined by their functions and inner logic, the sequential numbers shall not be contemplated as any limitation to the process to carry out the embodiments of the present disclosure.

Those ordinary skilled in the art could clearly understand, for the specific working process of the system, devices, or units described above, the corresponding processes in the foregoing method embodiments may be referred to, which will not be repeated here for the convenience and brevity of description.

The above description represents only specific embodiments of the present disclosure, however, the protection scope of the present disclosure is not limited thereto, any modification or substitution, easily conceived of by those ordinary skilled in the art based on the technical scope disclosed by the present disclosure, shall be encompassed within the protection scope of the present disclosure. Therefore, the protection scope of the present disclosure shall be subject to the protection scope of the claims.

What is claimed is:

1. A wireless communication method, comprising:
receiving, by a terminal device, first information and second information transmitted by a network device, wherein the first information is configured to trigger the terminal device to feed back aperiodic N pieces of channel state information (CSI), and to indicate a physical uplink shared channel (PUSCH) resource to be used when the CSIs are fed back, and the second information is configured to indicate channel measurement and interference measurement resources corresponding to the N CSIs, N being an integer greater than or equal to 2;
determining, by the terminal device, M CSIs that need to be fed back from the N CSIs according to the first information, the second information and M CSI processing units currently in an idle state, M being an integer greater than 0 and less than N; and
calculating, by the terminal device, payloads of the M CSIs that need to be fed back, respectively, and feeding back the M CSIs that need to be fed back on the PUSCH resource;
wherein determining, by the terminal device, the M CSIs that need to be fed back from the N CSIs according to the first information, the second information and the M CSI processing units currently in the idle state, comprises:
calculating, by the terminal device, priorities of the N CSIs, and select sequentially, according to an order of the priorities, M CSIs with highest priorities from the N CSIs as the M CSIs that need to be fed back; or
selecting, by the terminal device, according to an order of configuring the N CSIs, M CSIs that are configured first from the N CSIs as the M CSIs that need to be fed back; wherein, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting a PUSCH.

2. A terminal device, comprising:
a transceiver, a memory and a processor coupled to the memory;
the memory storing thereon instructions executable by the processor, wherein the processor is configured to execute the instructions to:
control the transceiver to receive first information and second information transmitted by a network device, wherein the first information is configured to trigger the terminal device to feed back aperiodic N pieces of channel state information (CSI), and to indicate a physical uplink shared channel (PUSCH) resource to be used when the CSIs are fed back, and the second information is configured to indicate channel measurement and interference measurement resources corresponding to the N CSIs, N being an integer greater than or equal to 2; and
determine at least one first time span for CSI calculation according to the first information, the second information and M CSI processing units currently in idle state, M being an integer greater than 0 and less than N;
determine M CSIs that need to be fed back from the N CSIs according to the at least one first time span;
calculate payloads of the M CSIs that need to be fed back, respectively, and feed back the M CSIs that need to be fed back on the PUSCH resource;
wherein the processor is configured to:
determine a time span between a last symbol of a resource that appears first among channel measurement and interference measurement resources corresponding to each CSI group of X CSI groups following a physical downlink control channel (PDCCH), and a first symbol reported on a PUSCH as one first time span, to obtain X first time spans, wherein each CSI group includes M CSIs, and each CSI in the X CSI groups belongs to the N CSIs, X being an integer greater than or equal to 2; or,
determine a time span between a last symbol of a resource that appears first among channel measurement and interference measurement resources corresponding to T CSIs in each CSI group of X CSI groups following a PDCCH, and a first symbol reported on a PUSCH as one first time span, to obtain X first time spans, wherein each CSI group includes M CSIs, and channel measurement and interference measurement resources corresponding to M-T CSIs included in each CSI group are periodic resources or quasi-periodic resources, and the terminal device has already cached downlink channel information corresponding to the M-T CSIs before receiving the first information and the second information, and each CSI in the X CSI groups belongs to the N CSIs, X being an integer greater than or equal to 2, and T being an integer greater than 0 and less than M.

3. The terminal device according to claim 2, wherein, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting the PUSCH.

4. The terminal device according to claim 2, wherein the processor is configured to:
determine at least one first time span satisfying a first condition from the X first time spans, and taking M CSIs corresponding to each of the at least one first time span satisfying the first condition as a CSI candidate, to obtain at least one CSI candidate, wherein the first condition is that a first time span is longer than or equal to a sum of respective calculation times of corresponding M CSIs; and
determine the M CSIs that need to be fed back from the at least one CSI candidate.

5. The terminal device according to claim 4, wherein the processor is configured to:
select, from the at least one CSI candidate, a CSI candidate with a maximum sum of the calculation times required as the M CSIs that need to be fed back; or
select, from the at least one CSI candidate, a CSI candidate with a highest priority as the M CSIs that need to be fed back; or
select, from the at least one CSI candidate, the M CSIs that need to be fed back according to a CSI configuration order; or
select, from the at least one CSI candidate, a CSI candidate with a minimum sum of CSI payloads as the M CSIs that need to be fed back; or
select, from the at least one CSI candidate, a CSI candidate with a maximum sum of CSI payloads as the M CSIs that need to be fed back; or
select, from the at least one CSI candidate, a CSI candidate with a maximum sum of CSI payloads that the PUSCH resources can support as the M CSIs that need to be fed back.

6. The terminal device according to claim 2, wherein the first information is configured to indicate a PUSCH time domain resource to be used when the CSIs are fed back, and the PUSCH time domain resource includes: a slot location, a starting symbol and lasting symbols.

7. The terminal device according to claim 2, wherein the second information is configured to indicate channel measurement and interference measurement time domain resources corresponding to the N CSIs, and the channel measurement and interference measurement time domain resources include a slot location, a starting symbol and lasting symbols.

8. The terminal device according to claim 2, wherein the channel measurement and interference measurement resources indicated by the second information are one type among periodic resources, quasi-periodic resources and aperiodic resources.

9. The terminal device according to claim 2, wherein the first information is downlink control information (DCI), and the second information is one of DCI, radio resource control (RRC) dedicated signaling or media access control (MAC) control element (CE).

10. A terminal device, comprising:
a transceiver, a memory and a processor coupled to the memory;
the memory storing thereon instructions executable by the processor, wherein the processor is configured to execute the instructions to:
control the transceiver to receive first information and second information transmitted by a network device, wherein the first information is configured to trigger the terminal device to feed back aperiodic N pieces of channel state information (CSI), and to indicate a physical uplink shared channel (PUSCH) resource to be used when the CSIs are fed back, and the second information is configured to indicate channel measurement and interference measurement resources corresponding to the N CSIs, N being an integer greater than or equal to 2; and
determine at least one first time span for CSI calculation according to the first information, the second information and M CSI processing units currently in idle state, M being an integer greater than 0 and less than N;
determine M CSIs that need to be fed back from the N CSIs according to the at least one first time span;
calculate payloads of the M CSIs that need to be fed back, respectively, and feed back the M CSIs that need to be fed back on the PUSCH resource;
wherein the processor is configured to:
determine a time span between a last symbol of a resource that appears first among the channel measurement and interference measurement resources corresponding to the N CSIs following a PDCCH, and a first symbol reported on a PUSCH as the first time span, wherein the channel measurement and interference measurement resources corresponding to the N CSIs are periodic resources, quasi-periodic resources, or aperiodic resources; or,
determine a time span between a last symbol of a resource that appears first among channel measurement and interference measurement resources corresponding to K CSIs of the N CSIs following a PDCCH, and a first symbol reported on a PUSCH as the first time span, wherein channel measurement and interference measurement resources corresponding to N-K CSIs of the N CSIs are periodic resources or quasi-periodic resources, and the terminal device has already cached downlink channel information corresponding to the N-K CSIs before receiving the first information and the second information, K being an integer greater than 0 and less than N.

11. The terminal device according to claim 10, wherein, when subcarrier spacings of channel measurement and interference measurement resources corresponding to different CSIs of the N CSIs are different, a calculation time required for each CSI of the N CSIs is obtained according to a time unit and a calculation time corresponding to a minimum subcarrier spacing of a subcarrier spacing of channel measurement and interference measurement resources corresponding to each CSI of the N CSIs and a subcarrier spacing for reporting the PUSCH.

12. The terminal device according to claim 10, wherein the processor is configured to:
determine M CSIs satisfying a second condition as a CSI candidate, to obtain at least one CSI candidate, wherein the second condition is that a sum of respective calculation times of the M CSIs is shorter than or equal to the first time span; and
determine the M CSIs that need to be fed back from the at least one CSI candidate.

13. The method according to claim 1, wherein if a calculation time required for the M CSIs that need to be fed back is longer than a time span between a last symbol of channel measurement and interference measurement resources corresponding to the M CSIs that need to be fed back and a first symbol reported on a PUSCH, the processor is further configured to give up on feeding back the M CSIs that need to be fed back.

14. The method according to claim 1, wherein if a sum of time spans from detecting a PDCCH to reporting a PUSCH that respectively required for the M CSIs that need to be fed back is longer than a time span between a last symbol of the PDCCH and a first symbol reported on the PUSCH, the processor is further configured to give up on feeding back the M CSIs that need to be fed back.

* * * * *